(12) United States Patent
Tsirkin et al.

(10) Patent No.: US 10,019,276 B2
(45) Date of Patent: Jul. 10, 2018

(54) DYNAMIC NON-UNIFORM MEMORY ARCHITECTURE (NUMA) LOCALITY FOR REMOTE DIRECT MEMORY ACCESS (RDMA) APPLICATIONS

(71) Applicant: Red Hat Israel, Ltd., Ra'anana (IL)

(72) Inventors: Michael Tsirkin, Ra'anana (IL); Andrea Arcangeli, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 381 days.

(21) Appl. No.: 14/723,085

(22) Filed: May 27, 2015

(65) Prior Publication Data
US 2016/0350260 A1 Dec. 1, 2016

(51) Int. Cl.
G06F 9/455 (2018.01)
G06F 15/173 (2006.01)

(52) U.S. Cl.
CPC .... G06F 9/45558 (2013.01); G06F 15/17331 (2013.01); *G06F 2009/45583* (2013.01)

(58) Field of Classification Search
CPC ............ G06F 15/167; G06F 15/17331; G06F 2009/45583; G06F 9/4555
USPC ....................................................... 709/212
See application file for complete search history.

(56) References Cited

U.S. PATENT DOCUMENTS

| | | | |
|---|---|---|---|
| 6,075,938 A | 6/2000 | Bugnion et al. | |
| 6,871,219 B2 | 3/2005 | Noordergraaf et al. | |
| 7,330,904 B1 | 2/2008 | Kleiman | |
| 7,756,943 B1* | 7/2010 | Wong | G06F 13/28 709/212 |
| 8,024,529 B2* | 9/2011 | Ezzat | G06F 15/167 711/147 |
| 8,082,400 B1* | 12/2011 | Chang | G06F 9/5077 709/213 |
| 8,688,798 B1* | 4/2014 | Lentini | H04L 67/1097 709/212 |
| 2005/0044301 A1* | 2/2005 | Vasilevsky | G06F 9/45533 711/1 |
| 2011/0055471 A1 | 3/2011 | Thatcher et al. | |

(Continued)

OTHER PUBLICATIONS

Murray, Derek G., H. Steven, and Michael A. Fetterman. "Satori: Enlightened page sharing." In Proceedings of the USENIX Annual Technical Conference. 2009.*

(Continued)

*Primary Examiner* — Michael C Lai
(74) *Attorney, Agent, or Firm* — Haynes and Boone, LLP

(57) ABSTRACT

An example method of moving RDMA memory from a first node to a second node includes protecting a memory region from write operations. The memory region resides on a first node and includes a set of RDMA memory pages. A list specifies the set of RDMA memory pages and is associated with a memory handler. The set of RDMA memory pages includes a first memory page. The method also includes allocating a second memory page that resides on a second node and copying data stored in the first memory page to the second memory page. The method also includes updating the list by replacing the first memory page specified in the list with the second memory page. The method further includes registering the updated list as RDMA memory. The updated list is associated with the memory handler after the registering.

20 Claims, 7 Drawing Sheets

(56) References Cited

U.S. PATENT DOCUMENTS

| | | | |
|---|---|---|---|
| 2012/0102243 A1* | 4/2012 | Glaeser | G06F 13/28 710/53 |
| 2012/0124282 A1 | 5/2012 | Frank et al. | |
| 2014/0201451 A1* | 7/2014 | Dube | G06F 12/084 711/130 |
| 2015/0220430 A1* | 8/2015 | Kim | G06F 12/0223 709/217 |

OTHER PUBLICATIONS

Yufei Ren, Tan Li, Dantong Yu, Shudong Jin, Thomas G. Robertazzi; Design and Performance Evaluation of NUMA-Aware RDMA-Based End-to-End Data Transfer Systems; 2013, 2 pages, Stony Brook University, Stony Brook, New York; Brookhaven National Laboratory, Upton, New York., retrieved from http://dl.acm.org/citation.cfm?id=2503260 on May 27, 2015.

Yufei Ren, Tan Li, Dantong Yu, Shudong Jin, Thomas G. Robertazzi; Design and Performance Evaluation of NUMA-Aware RDMA-Based End-to-End Data Transfer Systems, 27 pages, retrieved from http://www.cs.fsu.edu/~xyuan/cis5930/present_Zach.pdf on May 27, 2015.

* cited by examiner

DYNAMIC NON-UNIFORM MEMORY ARCHITECTURE (NUMA) LOCALITY FOR REMOTE DIRECT MEMORY ACCESS (RDMA) APPLICATIONS

FIELD OF DISCLOSURE

The present disclosure generally relates to memory management, and more particularly to moving remote direct memory access (RDMA) memory from one node to another node.

BACKGROUND

Remote Direct Memory Access (RDMA) typically allows a computer system to directly read or modify the memory of another computer system using "zero-copy," which refers to a memory allocation technique that provides computer systems with the ability to directly write data to and read data from remote memory and allows applications that implement RDMA to access remote buffers directly without the need to copy it between different software layers. An RDMA-enabled network interface adapter establishes connections to transfer the data directly between specified buffers in the user-space memory. Accordingly, this zero-copy approach is much more efficient than requiring multiple data transfers on each side of the network.

Unfortunately, RDMA memory is typically pinned, which means that the kernel is not allowed to swap that memory out to a paging file in the event that the overall computer starts running short on available memory. Accordingly, under traditional techniques, RDMA memory is pinned and cannot be moved from a source memory location to a target memory location because the RDMA memory is pinned at the source memory location.

BRIEF SUMMARY

It may be desirable to allow data stored in memory associated with Remote Direct Memory Access (RDMA) communications to be moved. This disclosure relates to moving RDMA memory from one node to another node. Methods, systems, and techniques are provided for moving RDMA memory pages from a first node to a second node.

According to an embodiment, a method of moving remote direct memory access (RDMA) memory from a first node to a second node includes protecting a memory region from write operations. The memory region resides on a first node and includes a set of RDMA memory pages. A list of physical memory pages specifies the set of RDMA memory pages and is associated with a memory handler. The set of RDMA memory pages includes a first memory page. The method also includes allocating a second memory page. The second memory page resides on a second node. The method further includes copying data stored in the first memory page to the second memory page. The method also includes updating the list of physical memory pages by replacing the first memory page specified in the list with the second memory page. The method further includes registering the updated list of physical memory pages as RDMA memory. The updated list of physical memory pages is associated with the memory handler after the registering.

According to another embodiment, a system for moving RDMA memory from a first node to a second node includes a first node that stores an RDMA memory region and a list of physical memory pages that specifies each memory page included in the RDMA memory region. The list of physical memory pages is associated with a memory handler. The RDMA memory region includes a first memory page. The system also includes a notifier that protects the memory region from write operations, allocates a second memory page that resides on a second node, copies data stored in the first memory page to the second memory page, and updates the list of physical memory pages by replacing the first memory page specified in the list with the second memory page. The system further includes an RDMA core that registers the updated list of physical memory pages as RDMA memory. The updated list of physical memory pages is associated with the memory handler after the updated list of physical memory pages is registered.

According to another embodiment, a non-transitory machine-readable medium includes a plurality of machine-readable instructions that when executed by one or more processors are adapted to cause the one or more processors to perform a method including: protecting a memory region from write operations, the memory region residing on a first node and including a set of RDMA memory pages, and a list of physical memory pages specifying the set of RDMA memory pages and being associated with a memory handler, where the set of RDMA memory pages includes a first memory page; allocating a second memory page, the second memory page residing on a second node; copying data stored in the first memory page to the second memory page; updating the list of physical memory pages by replacing the first memory page specified in the list with the second memory page; and registering the updated list of physical memory pages as RDMA memory, where the updated list of physical memory pages is associated with the memory handler after the registering.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
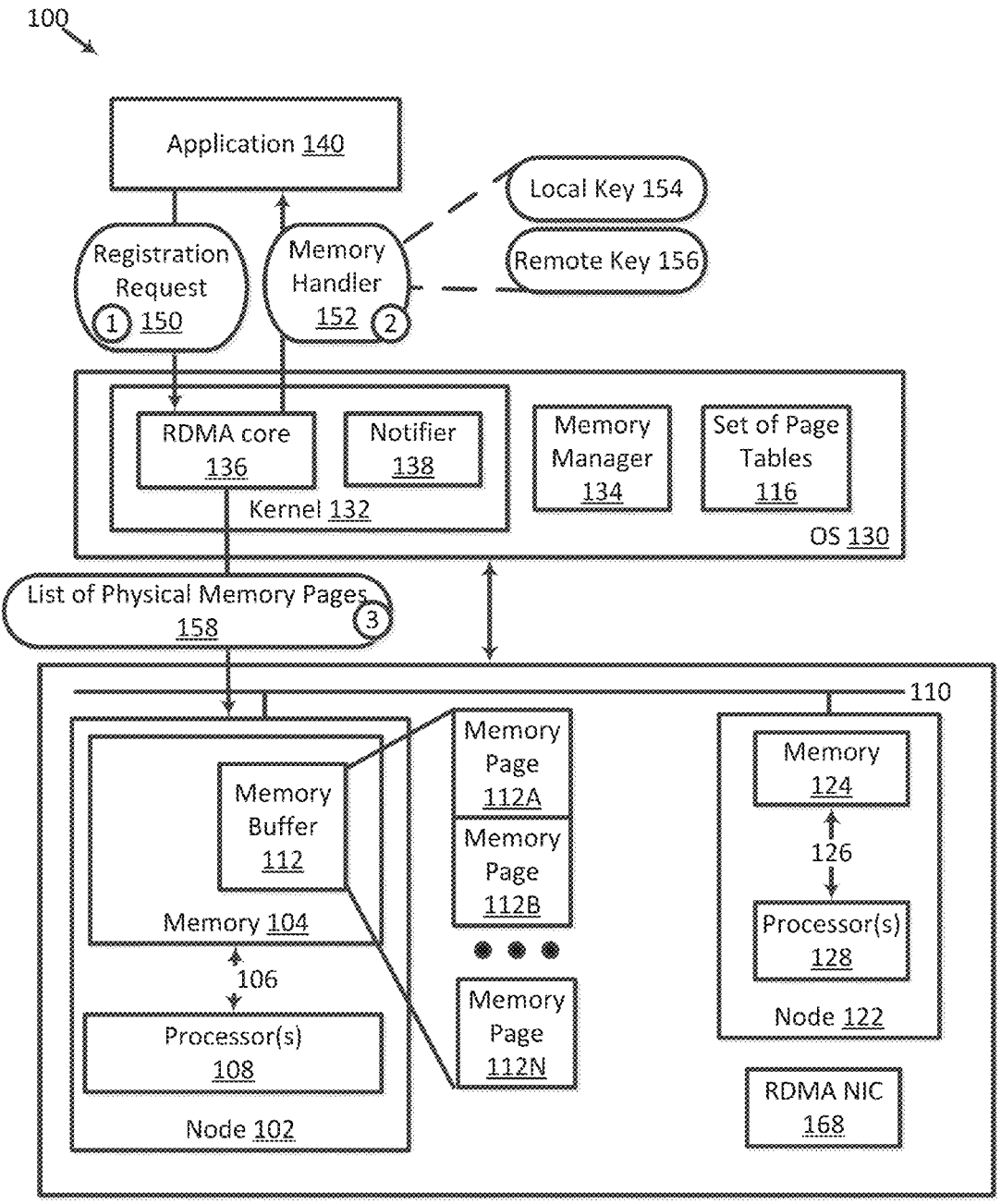
FIG. 1 depicts a high-level component diagram of one illustrative embodiment of a computer system in accordance with one or more aspects of the present disclosure.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the leftmost digit in the corresponding reference number.

DETAILED DESCRIPTION

I. Overview
II. Example System Architecture
III. Example Process Flow
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Described herein are methods and systems for providing dynamic Non-Uniform Memory Access or Non-Uniform Memory Architecture (NUMA) locality for Remote Direct Memory Access (RDMA) applications. NUMA is a computer memory design used in multiprocessor systems, where the memory access time depends on the memory location relative to the processor. Under NUMA, a processor can access its own local memory faster than non-local memory, that is, memory local to another processor or memory shared between processors. NUMA provides for separate memory for each processor (or group of processors) in a multiprocessor system, thereby avoiding the performance hit when several processors attempt to address the same memory. Each grouping of processor and associated connected memory is known as a NUMA node.

RDMA typically allows a computer system to directly read or modify the memory of another computer system using "zero-copy," which refers to a memory allocation technique that provides computer systems with the ability to directly write data to and read data from remote memory and allows applications that implement RDMA to access remote buffers directly without the need to copy it between different software layers. Features such as zero-copy and Remote Direct Memory Access (RDMA) help reduce processor overhead by directly transferring data from sender memory to receiver memory without involving host processors.

A NUMA node may include RDMA memory. It may be desirable to move RDMA memory from one node (e.g., NUMA node) to another node (e.g., NUMA node), for example, for load balancing purposes. A "node" herein refers to a group of one or more processors and one or more associated memory devices locally accessible by the processors in the group.

RDMA communications typically require that physical memory in the computer be pinned (meaning that the kernel is not allowed to swap that memory out to a paging file in the event that the overall computer starts running short on available memory). In an example, every memory buffer that is accessed by an RDMA device is registered. During the registration process, the memory is typically pinned (prevented from being swapped out), and the memory translation information (from virtual addresses to physical addresses) is saved in the RDMA device. The pinning of memory may be undesirable because it cannot be easily moved.

The present disclosure provides techniques to move RDMA memory from one node to another node. In an example, RDMA memory is moved from one NUMA node to another NUMA node. In some embodiments, a method of moving RDMA memory from a first node to a second node includes protecting a memory region from write operations. The memory region resides on a first node and includes a set of RDMA memory pages. A list specifies the set of RDMA memory pages and is associated with a memory handler. The set of RDMA memory pages includes a first memory page. The method also includes allocating a second memory page that resides on a second node and copying data stored in the first memory page to the second memory page. The method also includes updating the list by replacing the first memory page specified in the list with the second memory page. The method further includes registering the updated list as RDMA memory. The updated list is associated with the memory handler after the registering.

Unless specifically stated otherwise, as apparent from the following discussion, it is appreciated that throughout the description, discussions utilizing terms such as "determining," "protecting," "sending," "receiving," "allocating," "copying," "replacing," "registering," "setting," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 depicts a high-level component diagram of one illustrative embodiment of a computer system 100 in accordance with one or more aspects of the present disclosure. A "computer system" herein shall refer to a system including one or more processors and one or more memory devices. In some examples, a NUMA node may be considered a computer system.

Computer system 100 includes nodes 102 and 122. Although computer system 100 is illustrated as including two nodes, it should be understood that computer system 100 may include more than two nodes. In some implementations, computer system 100 supports the NUMA architectural model, according to which a physical processor of a multi-processor computer system may be directly connected to some memory devices while being indirectly connected (e.g., via other processors) to some other memory devices. A NUMA system may be characterized by the system topology information including memory access latency values for one or more processors accessing memory pages residing on various memory devices. For example, in a NUMA system, some regions of memory are on physically different buses from other regions. Herein, "local" memory access refers to a memory access via a local bus (e.g., PCI bus) and is accessed by a processor on the same NUMA node. Additionally, "foreign" memory access refers to a memory access via other devices such as other processors and/or system area networks, and is accessed by a processor on a different NUMA node.

Each node 102, 122 may be a NUMA node including a memory 104, 124 and one or more processors 108, 128.

Local connections within each node, including the connections between a processor 108 and a memory 104, may be provided by one or more local buses of suitable architecture. In some examples, NUMA node 102 includes memory 104 with a local memory bus 106 to processor(s) 108. Similarly, NUMA node 122 includes memory 124 with a local memory bus 126 to processor(s) 128. NUMA nodes may be coupled to each other via a system interconnect crossbar/switch 110. In an example, accessing "foreign" memory may be expensive because the request leaves one NUMA node (e.g., node 102) and traverses system interconnect crossbar/switch 110 to get to another NUMA node (e.g., node 122) that holds the required information in its memory (e.g., memory 124).

A node may also include a network interface adapter (not shown), which herein shall refer to a device capable of implementing a physical layer and data link layer standard (such as Ethernet or InfiniBand). "Memory" herein shall refer to volatile or non-volatile memory, such as random access memory (RAM), read-only memory (ROM), electrically erasable ROM (EEPROM), or any other memory capable of storing data.

"Physical processor" or "processor" herein shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Computer system 100 includes an application 140, RDMA network interface card (NIC) 168, and an operating system 130 coupled to nodes 102 and 122. Operating system 130 includes a kernel 132 and memory manager 134. Kernel 132 may manage resources of computer system 100 when one or more applications are running on computer system 100. In an example, kernel 132 may share available resources (e.g., CPU time, disk space, and network connections) between various system processes while at the same time ensuring system integrity. In an example, kernel 132 is a LINUX® kernel. Trademarks are the property of their respective owners.

Kernel 132 may use a memory management technique called virtual memory, which maps virtual addresses used by an application to physical addresses in memory. In a virtual memory system, the addresses seen by user programs do not directly correspond to the physical addresses used by the hardware. A processor may include a memory management unit (MMU) (not shown) that supports the use of virtual memory. With MMU, memory addresses may go through a translation step from a virtual address to a physical address prior to each memory access. Memory 104, 124 may include random access memory (RAM), and a MMU may divide the RAM into pages. A page is a contiguous section of memory of a set size that is handled by the MMU. In an example, each page is 4 kilobytes (KB).

Memory manager 134 maintains a set of pages tables 116 for each application running in computer system 100. Set of page tables 116 is stored in memory, and each stored row of a page table is called a page table entry. Each entry in a page table maps a location in an application's virtual memory space to a location in the physical memory space. In an example, address translation transforms addresses in application 140's virtual address space to locations in physical memory (e.g., memory 104 or memory 124). The page table entry for a virtual page has permission bits that specify what a user space process can and cannot do with the particular page. The permission bits may specify whether a user space process may perform read, write, and/or execute (execution permission indicates that page binary data may be executed as machine code in the same way as programs are executed) operations on the page.

Kernel 132 includes an RDMA core 136 and a notifier 138. RDMA core 136 may implement RDMA within computer system 100 by registering a memory region as RDMA memory, which shall refer to memory that is directly accessible by nodes within computer system 100 (or within another computer system coupled over a network to computer system 100). An RDMA device may refer to any component that accesses or uses memory that has been registered as RDMA memory. Notifier 138 may perform actions to move RDMA memory from one node to another node within or remote from computer system 100.

Each memory region accessed by an RDMA device is registered with RDMA core 136 by sending a registration request to RDMA core 136. In the example illustrated in FIG. 1, application 140 sends a registration request 150 to RDMA core 136. Registration request 150 may be a request to register a memory region. Kernel 132 may expose an application programming interface (API), which allows programs in user space to access system resources and services of kernel 132. In an embodiment, RDMA core 136 exposes a registration API, and application 140 invokes the registration API to register a memory region as RDMA memory. As part of registration request 150, application 140 may also specify whether RDMA hardware has read or write access to the memory region. Accordingly, application 140 will know whether RDMA hardware may modify the memory region or always read from the memory region. These permissions to access the memory region are saved in RDMA NIC 168. In an example, application 140 may specify that RDMA hardware has write, write-only, read, read-only, and/or execute permissions for the memory region. RDMA core 136 may check the permissions of the memory region to ensure that the requested permissions for the memory region is supported by them.

Additionally, for each memory page included in the memory region, operating system 130 may store the access permissions of the respective memory page into set of page tables 116. The access permissions of a memory page are the same as the memory region within which the memory page resides. Memory manager 134 may check the permissions of a memory page to ensure that the requested permissions for the memory page is supported by them. In an example, memory manager 134 checks set of pages tables 116 to determine whether the access permissions to a particular memory page.

Responsive to registration request 150, RDMA core 136 retrieves a memory buffer 112 from application 140's memory space and registers memory buffer 112 as RDMA memory. During registration of memory buffer 112, RDMA core 136 may partition the contiguous memory region into physical memory pages 112A, 112B, . . . , 112N, and provide a mapping of the virtual-to-physical address translation. For example, RDMA core 136 may store a mapping of the virtual memory addresses corresponding to memory buffer 112 to their physical memory addresses into RDMA NIC 168. Additionally, operating system 130 may store a mapping of the virtual memory address of each memory page included in memory buffer 112 to its physical memory address into set of page tables 116.

After memory registration is successfully completed, RDMA core 136 may return a memory handler 152 associated with memory buffer 112 to application 140, and store a list of physical memory pages 158 in memory 104. Memory buffer 112 is composed of the memory pages listed in list of physical memory pages 158. In FIG. 1, list of physical memory pages 158 specifies memory pages 112A, 112B, . . . , and 112N. List of physical memory pages 158 specifies a set of physical memory pages of which memory buffer 112 is composed. In an example, list of physical memory pages 158 is an array of pointers that reference memory pages. Each slot in the array may reference a memory page specified in list of physical memory pages 158.

In some examples, every registered memory region is associated with a memory handler, which has two keys, one for local access and one for remote access. Those keys will be used when specifying those memory regions in work requests. In an example, memory handler 152 includes a local key 154 and a remote key 156. Local key 154 is a key that is used by application 140 for accessing memory buffer 112 (e.g., for local work requests). Remote key 156 is a key that is used by another application for accessing memory buffer 112 using RDMA operations.

Notifier 138 may save a mapping from memory handler 152 (e.g., local key 154 and remote key 156) to list of physical memory pages 158. Memory handler 152 may be a pointer to the virtual address space that, from application 140's point of view, references list of physical memory pages 158. Application 140 may use memory handler 152 in work requests when referring to memory buffer 112, and memory manager 134 may translate the virtual memory address associated with memory handler 152 into the appropriate physical memory address in order to access the requested data. For example, application 140 may provide memory handler 152 (e.g., local key 154) to the RDMA hardware (e.g., memory 104) for access to memory buffer 112. In this example, memory manager 134 may translate the virtual memory address referenced by memory handler 152 to a physical memory address in hardware in order to determine the correct physical memory address at which the requested data is stored. In such an example, the requested data may be stored at one or more RDMA memory pages of which memory buffer 112 is composed.

After the memory registration is successfully completed, the RDMA hardware in computer system 100 has direct access to the memory pages of memory buffer 112. Memory buffer 112 is usable for RDMA and may be referred to as RDMA memory. A memory page that has been registered with RDMA core 136 may be referred to as an RDMA memory page. Application 140 may write into memory buffer 112 residing on node 102, and the data written into memory buffer 112 may be directly transferred from memory buffer 112 to, for example, memory 124 residing on node 122 without involving processor(s) 108 or processor(s) 128. In such an example, memory 124 may also have a memory region that is registered as RDMA memory, which can directly access memory buffer 112.

Conventionally, RDMA memory is pinned. If memory is pinned, the pinned memory cannot be moved and stays allocated in RAM. For example, the same virtual memory addresses associated with pinned memory always map to the same physical memory addresses. If memory buffer 112 is not pinned, however, memory pages of memory buffer 112 are not required to stay in the same memory locations and may be moved to other memory locations.

The present disclosure provides for techniques that enable RDMA memory to be moved from one memory location to another memory location. For example, RDMA core 136 may move one or more RDMA memory pages residing on one node to another node. RDMA core 136 may move an RDMA memory page for a variety of reasons. In an example, application 140 may request that an RDMA memory page be moved from one node to another node within computer system 100 (or to another node remote from computer system 100). In another example, operating system 130 may detect that moving the RDMA memory page from one node to another node may lead to better performance. In such an example, operating system 130 may monitor and detect access patterns, and determine that moving the RDMA memory page to the other node reduces non-local memory accesses. In this way, load balancing may be performed and increase system performance. Additionally, the decision to move an RDMA memory page may or may not be a global process. For example, memory pages may be moved one at a time and/or the decision to move a memory page may be decided on a page-by-page basis.

In some embodiments, RDMA core 136 does not "pin" the physical memory pages of memory buffer 112. In some embodiments, RDMA core 136 pins the physical memory pages of memory buffer 112, but allows application 140 to unpin particular memory pages of memory buffer 112 and thus relinquish particular memory pages from being pinned. In some embodiments, a memory page is pinned only if it is being used by RDMA. For example, each time application 140 desires to access a memory page, application 140 may manually pin the memory page. In such an example, most of the memory (e.g., unpinned memory) may be moved to other memory locations.

III. Example Process Flow

Figure 2:
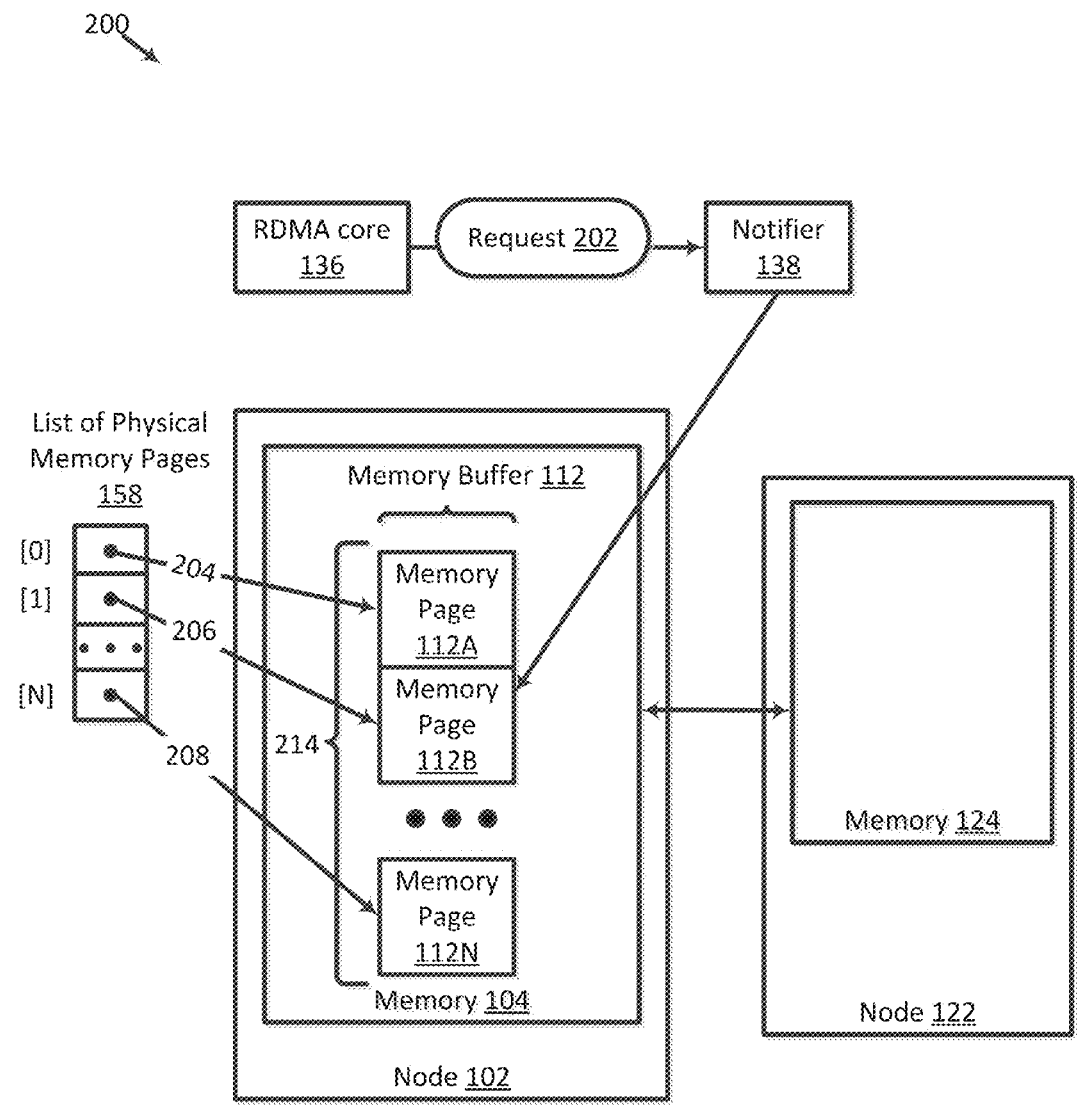
FIG. 2 illustrates a block diagram of determining whether RDMA memory is movable from a first node to a second node in accordance with one or more aspects of the present disclosure.

FIG. 2 illustrates a block diagram 200 of determining whether RDMA memory is movable from a first node to a second node in accordance with one or more aspects of the present disclosure. In the example illustrated in FIG. 2, list of physical memory pages 158 is an array including pointers that point to each of the memory pages of which memory buffer 112 is composed. Memory buffer 112 is composed of memory pages 112A, 112B, . . . , 112N, and notifier 138 maintains list of physical memory pages 158, which specifies a first set of memory pages 214 that includes memory pages 112A, 112B, . . . , and 112N. Index [0] of list of physical memory pages 158 stores a reference 204 to memory page 112A, index [1] of list of physical memory pages 158 stores a reference to 206 to memory page 112A, . . . and index [N] of list of physical memory pages 158 stores a reference 208 to memory page 112N.

In accordance with a request from application 140, RDMA core 136 may register first set of memory pages 214 specified in list of physical memory pages 158 as RDMA memory to produce a first set of RDMA memory pages. After registering first set of memory pages 214, first set of memory pages 214 is associated with memory handler 152, which may reference list of physical memory pages 158. In the following description, RDMA core 136 determines to move memory page 112B. It should be understood that RDMA core 136 may determine to move any of the RDMA memory pages residing on any of the nodes to another node within computer system 100 or remote from computer system 100. The node that resides in a computer system remote from computer system 100 may be coupled to computer system 100 via a network.

RDMA core 136 may request the services of notifier 138 for moving memory page 112B from node 102 to node 122. In an example, RDMA core 136 sends a request 202 to notifier 138 to move memory page 112B from node 102 to node 122. Responsive to request 202, notifier 138 may identify the RDMA memory region that includes memory page 112, which is memory buffer 112, and then determine whether RDMA hardware has permission to perform write operations on memory buffer 112. Notifier 138 may check the permissions of memory buffer 112 by reading them from RDMA NIC 168. If notifier 138 determines that RDMA hardware has permission to perform write operations on memory buffer 112, notifier 138 may determine that memory page 112B is not movable to another node. In some examples, notifier 138 sends a message indicating that memory page 112B cannot be moved from node 102 to node 122 to application 140. If notifier 138 determines that RDMA hardware has permission to only perform read operations on memory buffer 112, notifier 138 may determine that memory page 112B is movable to another node.

Figure 3A:
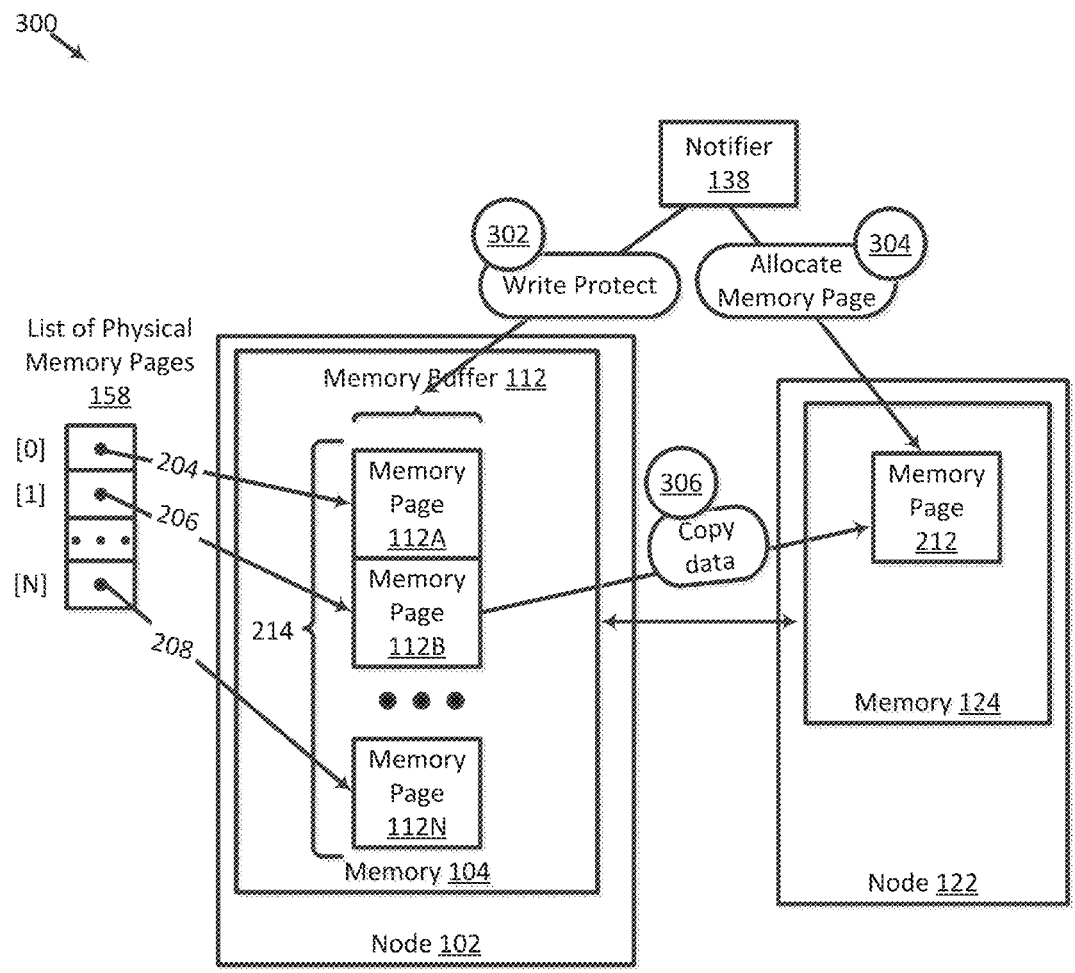
FIGS. 3A and 3B illustrate a process flow of moving RDMA memory from a first node to a second node in accordance with one or more aspects of the present disclosure.
Figure 3B:
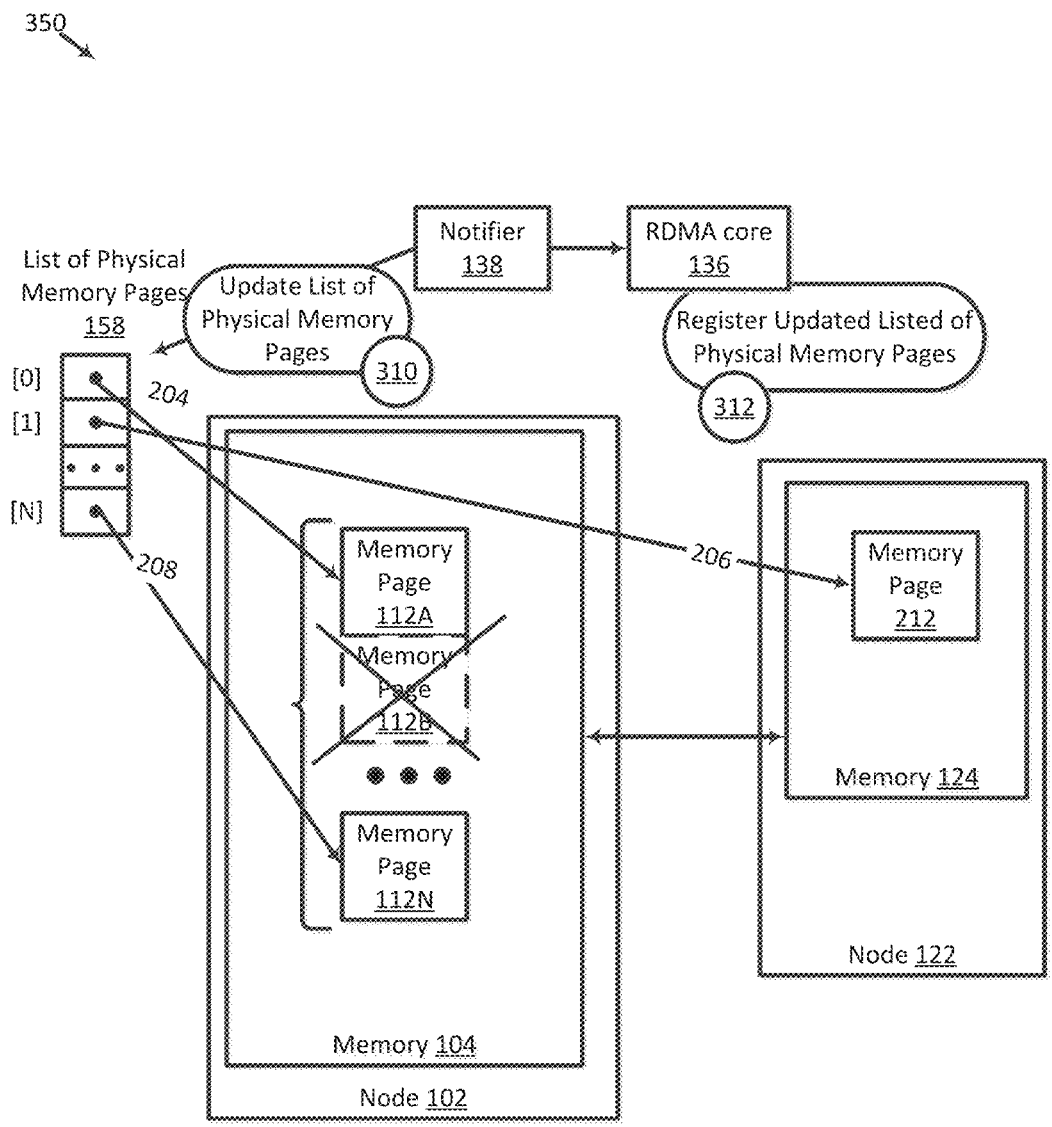

FIGS. 3A and 3B illustrate a process flow 300, 350 of moving RDMA memory from a first node to a second node in accordance with one or more aspects of the present disclosure. In FIG. 3A, if notifier 138 determines that memory page 112B is movable to another node, at an action 302, notifier 138 may protect memory buffer 112 from write operations. In an example, notifier 138 may protect memory buffer 112 from write operations by setting a bit in memory buffer 112's corresponding page tables (not shown) in RDMA NIC 168 to indicate that no write operations are allowed on memory buffer 112. After memory buffer 112 has been protected from write operations, the memory buffer is non-modifiable by applications or other RDMA hardware. If application 140 attempts to modify memory buffer 112, kernel 132 may block application 140 until the appropriate memory page has been completely moved to another node. In an example, kernel 132 may suspend application 140 until the appropriate memory page has been completely moved to another node.

At an action 304, notifier 138 allocates memory page 212 from memory 124, which resides on node 122. At an action 306, notifier 138 copies data stored in memory page 112B (residing on node 102) to memory page 212 (residing on node 122). Accordingly, the data stored in memory page 112B is now also stored in memory page 212 at node 122.

In FIG. 3B, at an action 310, notifier 138 updates list of physical memory pages 158. In an example, notifier 138 updates list of physical memory pages 158 by replacing memory page 112 specified in list of physical memory pages 158 with memory page 212. Reference 206, which pointed to memory page 112B in FIG. 3A, now points to memory page 212. Accordingly, list of physical memory pages 158 specifies a second set of memory pages that includes memory page 112A, memory page 212, . . . , and memory page N 112N. The second set of memory pages is different from first set of memory pages 214. For example, the updated list of physical memory pages specifies the destination memory page to which the RDMA memory is moved (e.g., memory page 212), but does not specify the source memory page from which the RDMA memory is moved (e.g., memory page 112B). In particular, the updated list of physical memory pages specifies memory page 212, but not memory page 112B.

Notifier 138 may send an indication to RDMA core 136 to register the updated list of physical memory pages. At an action 312, RDMA core 136 registers the updated list of physical memory pages as RDMA memory. After the registration successfully completes, the updated list of physical memory pages is associated with memory handler 152. In some examples, notifier 138 passes the array that references each of the physical memory pages specified in the updated list of physical memory pages to RDMA core 136 for registration. In some examples, notifier 138 sends the updated list of physical memory pages and memory handler 152 to RDMA core 136 for re-registration and association.

RDMA core 136 may register the updated list of physical memory pages by re-registering the updated list (e.g., memory pages 112A, 212, . . . , 112N). In an example, RDMA core 136 executes a re-register command that re-registers each of the physical memory pages specified in the updated list of physical memory pages. After the re-registration, the memory pages specified in the updated list of physical memory pages become associated with memory handler 152, which was initially associated with first set of memory pages 214.

For example, referring to FIG. 1, memory handler 152 is associated with and references an initial list of physical memory pages 158. Re-registering the updated list of physical memory pages enables a different set of memory pages (e.g., memory pages 112A, 212, . . . , 112N compared to memory pages 112A, 112B, . . . , 112N) to be associated with and referenced by memory handler 152. In particular, memory handler 152 may be associated with and reference a different set of memory pages than memory handler 152 was initially associated with or referenced before the re-registration. After RDMA core 136 re-registers the updated list of physical memory pages, the RDMA hardware (e.g., RDMA NIC 168) is updated, and the same memory handler 152 that initially returned first set of memory pages 214 will now return the second set of memory pages specified in the updated list of physical memory pages. As such, RDMA hardware is able to switch between different sets of memory pages for the same memory handler.

In some examples, re-registration of the updated list of physical memory pages updates the mapping of memory handler 152 (e.g., local key 154 and remote key 156) that initially mapped to first set of memory pages 214 to map to the updated list of physical memory pages. Accordingly, after re-registration of the updated list of physical memory pages, memory handler 152 no longer references first set of memory pages 214; rather, memory handler 152 references the updated memory buffer 112 (e.g., the updated list of physical memory pages).

Additionally, before the registration (or re-registration) of the updated list of physical memory pages, application 140's set of pages 116 stores a mapping of a virtual memory address to memory page 112B. Notifier 138 may update application 140's set of page tables 116 to reflect that memory page 212 now holds the data initially stored in memory page 112B and should be used rather than memory page 112B. In an example, notifier 138 identifies in application 140's set of page tables 116 a mapping of a virtual memory address to memory page 112B, and updates the mapping to reference memory page 212. In this example, the updated mapping is of the virtual memory address to memory page 212. As such, both application 140 and RDMA hardware reference (or point to) memory page 212. After updating set of page tables 116, notifier 138 may set memory page 212 to a writeable mode. If a memory page is set to the writeable mode, applications may perform write operations on the memory page.

Memory page 112B may be reused for some other purpose. An embodiment of the disclosure may provide for load balancing and movement of memory when, for example, available memory in memory 104 falls below a threshold.

Figure 4:
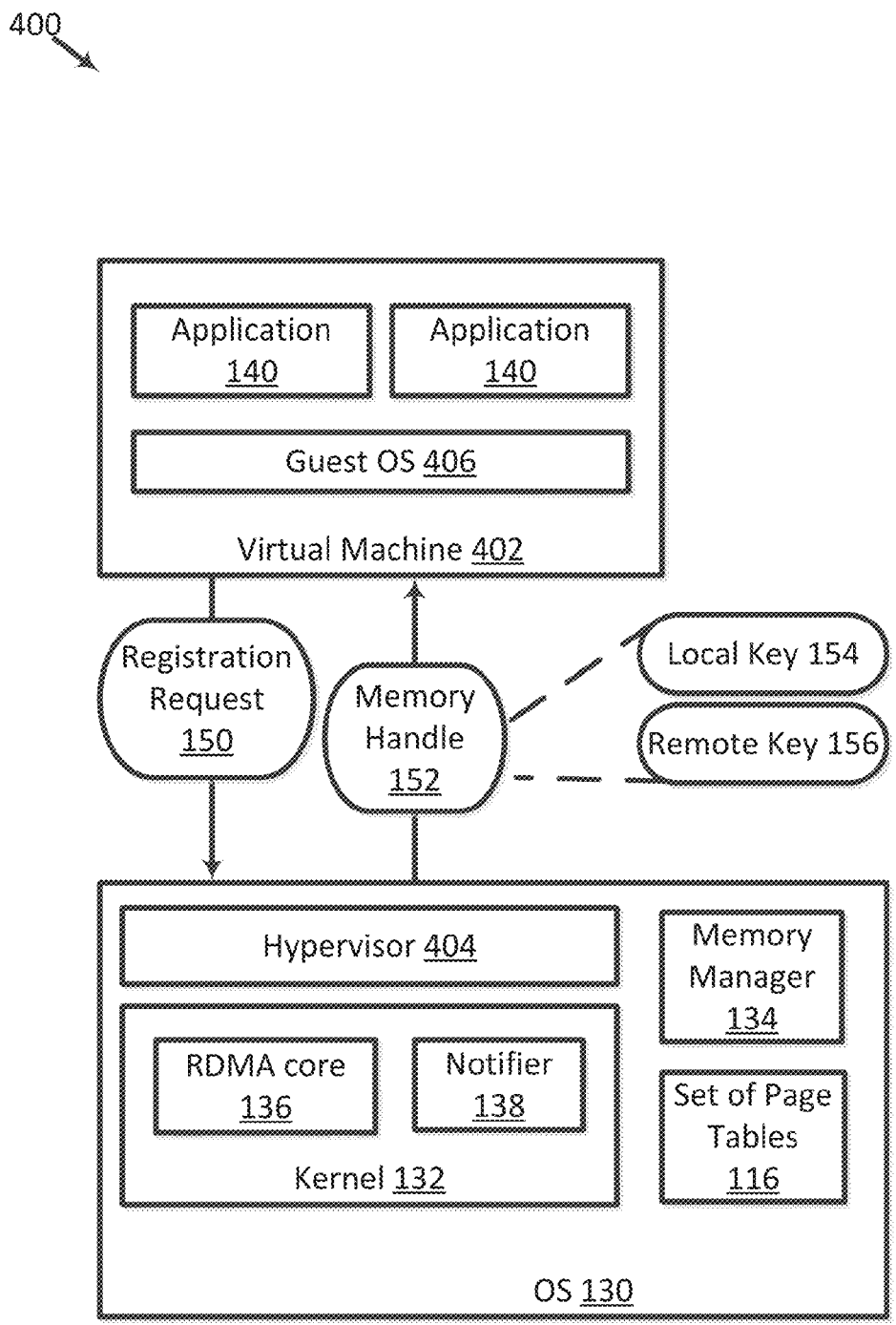
FIG. 4 depicts a high-level component diagram of one illustrative embodiment of a host computer system in accordance with one or more aspects of the present disclosure.

As discussed above and further emphasized here, FIGS. 1, 2, 3A, and 3B are merely examples, which should not unduly limit the scope of the claims. For example, in one illustrative embodiment, as schematically shown in FIG. 1, computer system 100 may execute operating system 130 and one or more applications 140. In another illustrative example, as schematically shown in FIG. 4, a host computer system 400 may run one or more virtual machines (VMs) that run applications and services. FIG. 4 depicts a high-level component diagram of one illustrative embodiment of a computer system in accordance with one or more aspects of the present disclosure. In FIG. 4, host computer system 400 includes a VM 402, hypervisor 404, and applications 140. Although one VM is illustrated as running on host computer system 400, other embodiments including more than one VM are within the scope of the present disclosure.

Hypervisor 404 may allow multiple operating systems (OSs), called guests, to run on the same physical system by offering virtualized hardware to the guests. Host computer system 400 may run multiple OSs, concurrently and in isolation from other programs on a single system. A VM may include a guest that executes a device driver (not shown) that communicates with the hardware devices. Host computer system 400 may run multiple virtual machines 402, by executing a software layer, often referred to as hypervisor 404 above the hardware and below the virtual machines. In certain implementations, hypervisor 404 may be a component of operating system 130 executed by host computer system 400. Alternatively, hypervisor 404 may be provided by an application running under host operating system 130, or may run directly on host computer system 400 without an operating system beneath it.

Hypervisor 404 may abstract the physical layer, including processors, memory, and I/O devices, and present this abstraction to virtual machines 402 as virtual devices, including virtual processors, virtual memory, and virtual I/O devices. A virtual machine 402 may execute a guest OS 406, which may utilize the underlying virtual devices, each of which may map to a device of host computer system 400 (e.g., a network interface device (not shown), a CD-ROM drive, etc. (not shown)). One or more applications 140 may be running on virtual machine 402 under guest OS 406.

Virtualization may be viewed as an abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

In FIG. 4, each virtual machine and/or application running on a virtual machine may be assigned its own virtual memory space and may be considered application 140, as discussed above, and notifier 138 may maintain a set of page tables for each virtual machine and each application running in the virtual machine. Additionally, RDMA NIC 168 may maintain a set of page tables for each registered memory region, where the set of page tables includes access permissions to the registered memory regions. The above and below descriptions in relation to movement of RDMA memory associated with the virtual machine or applications running on the virtual machines may apply.

IV. Example Method

Figure 5:
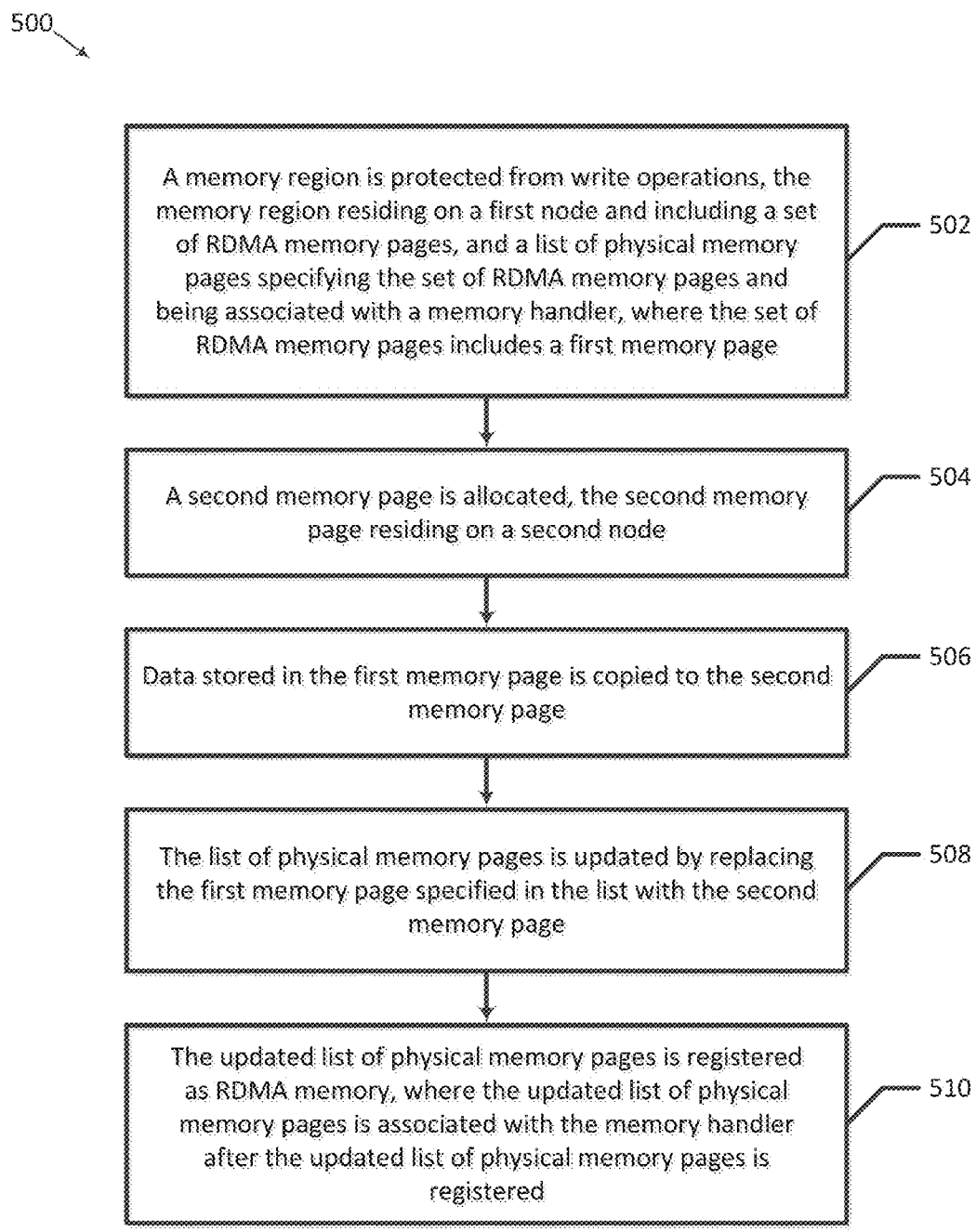
FIG. 5 is a simplified flowchart illustrating a method of moving RDMA memory from a first node to a second node in accordance with one or more aspects of the present disclosure.

FIG. 5 is a simplified flowchart illustrating a method 500 of moving RDMA memory from a first node to a second node in accordance with one or more aspects of the present disclosure. Method 500 is not meant to be limiting and may be used in other applications.

Method 500 includes blocks 502-510. In a block 502, a memory region is protected from write operations, the memory region residing on a first node and including a set of RDMA memory pages, and a list of physical memory pages specifying the set of RDMA memory pages and being associated with a memory handler, where the set of RDMA memory pages includes a first memory page. In an example, notifier 138 protects memory buffer 112 from write operations, memory buffer 112 residing on node 102 and including a set of RDMA memory pages 214, and a list of physical memory pages specifying set of RDMA memory pages 214 and being associated with memory handler 152, where set of RDMA memory pages 214 includes memory page 112A.

In a block 504, a second memory page is allocated, the second memory page residing on a second node. In an example, notifier 138 allocates memory page 212, where memory page 212 resides on node 122. In a block 506, data stored in the first memory page is copied to the second memory page. In an example, notifier 138 copies data stored in memory page 112B to memory page 212. In a block 508, the list of physical memory pages is updated by replacing the first memory page specified in the list with the second memory page. In an example, notifier 138 updates list of physical memory pages 158 by replacing memory page 112B specified in list of physical memory pages 158 with memory page 212.

In a block 510, the updated list of physical memory pages is registered as RDMA memory, where the updated list of physical memory pages is associated with the memory handler after the updated list of physical memory pages is registered. In an example, notifier 138 registers the updated list of physical memory pages as RDMA memory, where the updated list of physical memory pages is associated with memory handler 152 after the updated list of physical memory pages is registered. In some examples, notifier 138 determines access permissions of memory buffer 112 from RDMA NIC 168. In an example, blocks 502-510 are performed only if memory buffer 112 is determined to be in a read-only mode. Notifier 138 may send a message indicating that memory page 112B is not movable if memory buffer 112 is determined to be modifiable (e.g., in a writeable mode). It should be understood that a writeable mode may include a read-writeable mode.

In some embodiments, one or more actions illustrated in blocks 502-510 may be performed for any number of requests for moving RDMA memory from one node to another node. It is also understood that additional processes may be performed before, during, or after blocks 502-510 discussed above. It is also understood that one or more of the blocks of method 500 described herein may be omitted, combined, or performed in a different sequence as desired.

V. Example Computing System

Figure 6:
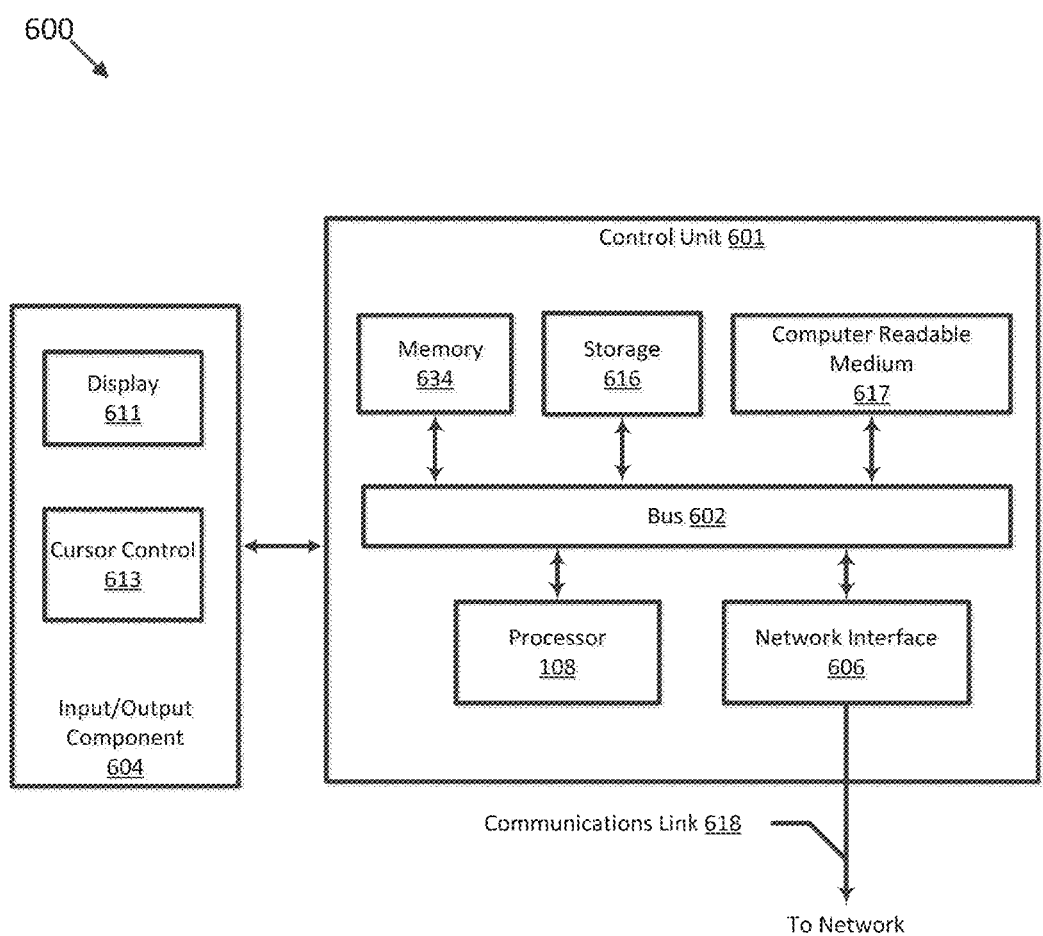
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computer system 100 may include a client or a server computing device. The client or server computing device may include a plurality of processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. In an example, a user may interact with application 140 or virtual machine 402 using I/O component 604 and cause available free memory in memory 104 to fall below a threshold. In response to the free memory in memory 104 falling below the threshold, operating system 130 may determine that an RDMA memory page should be moved from node 102 to node 122. I/O component 604 may also include an output component such as a display 611, and an input control such as a cursor control 613 (such as a keyboard, keypad, mouse, etc.).

A transceiver or network interface 606 transmits and receives signals between computer system 600 and other devices via a communication link 618 to a network. In an embodiment, the transmission is wireless, although other transmission mediums and methods may also be suitable. A processor 108, which may be a micro-controller, digital signal processor (DSP), or other processing component, processes these various signals, such as for display on computer system 600 or transmission to other devices via communication link 618. Processor 108 may also control transmission of information, such as cookies or IP addresses, to other devices. In an example, if a memory page is moved from a first node to a second node that is remote from computer system 600, the memory page may be transmitted to the remote computer system via network interface 606 over communication link 618.

Components of computer system 600 also include a system memory component 634 (e.g., RAM), a static storage component 616 (e.g., ROM), and/or a disk drive 617. System memory component 634 may include memory 104 residing in node 102 and memory 124 residing in node 122. Computer system 600 performs specific operations by processor 108 and other components by executing one or more sequences of instructions contained in system memory component 634. Logic may be encoded in a computer readable medium, which may refer to any medium that participates in providing instructions to processor 108 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of moving remote direct memory access (RDMA) memory from a first node to a second node, comprising:

protecting a memory region from write operations, the memory region residing on a first node and including a set of RDMA memory pages, and a list of physical memory pages specifying the set of RDMA memory pages and being associated with a memory handler, wherein the set of RDMA memory pages includes a first memory page;

allocating a second memory page, the second memory page residing on a second node;

copying data stored in the first memory page to the second memory page;

updating the list of physical memory pages by replacing the first memory page specified in the list with the second memory page; and registering memory pages specified in the updated list of physical memory pages as RDMA memory, wherein the updated list of physical memory pages is associated with the memory handler after the specified memory pages are registered.

2. The method of claim 1, further comprising:

determining access permissions of the memory region, wherein the protecting, allocating, copying, updating, and registering memory pages specified in the updated list of physical memory pages is performed only if the memory region is determined to be in a read-only mode; and determining that the first memory page is not moveable to the second node if the memory region is determined to be in a writeable mode.

3. The method of claim 1, wherein registering memory pages specified in the updated list of physical memory pages includes re-registering the updated list of physical memory pages and associating the memory pages specified in the updated list with the memory handler.

4. The method of claim 1, wherein the first node and the second node are represented by Non-Uniform Memory Access (NUMA) nodes.

5. The method of claim 1, wherein the registering includes executing a re-registration command that re-registers the updated list of physical memory pages as RDMA memory.

6. The method of claim 1, wherein the memory handler includes a local key and a remote key.

7. The method of claim 1, wherein the set of RDMA memory pages is associated with an application, the method further comprising:

identifying in the application's set of page tables a mapping from a virtual memory address to the first memory page; and updating the mapping to reference the second memory page, wherein the updated mapping maps the virtual memory address to the second memory page.

8. The method of claim 7, further comprising:

after updating the mapping, setting the second memory page to a writeable mode.

9. The method of claim 7, wherein the set of RDMA memory pages is associated with a virtual machine, and the method further comprising:

after updating the mapping, setting the second memory page to a writeable mode.

10. The method of claim 1, wherein the first node is different from the second node.

11. The method of claim 1, wherein registering memory pages includes registering each memory page specified in the updated list of physical memory pages as RDMA memory.

12. A system for moving remote direct memory access (RDMA) memory from a first node to a second node, comprising:

a first node that stores an RDMA memory region and a list of physical memory pages that specifies each memory page included in the RDMA memory region, wherein the list of physical memory pages is associated with a memory handler, and the RDMA memory region includes a first memory page;

a notifier that protects the memory region from write operations, allocates a second memory page that resides on a second node, copies data stored in the first memory page to the second memory page, and updates the list of physical memory pages by replacing the first memory page specified in the list with the second memory page; and an RDMA core that registers memory pages specified in the updated list of physical memory pages as RDMA memory, wherein the updated list of physical memory pages is associated with the memory handler after the specified memory pages are registered.

13. The system of claim 12, wherein the first node and the second node are represented by Non-Uniform Memory Access (NUMA) nodes.

14. The system of claim 12, wherein the RDMA core registers a memory buffer to produce one or more RDMA memory pages, wherein the list of physical memory pages is associated with the memory handler after the memory buffer is registered.

15. The system of claim 14, wherein the RDMA core determines whether RDMA hardware has permission to perform write operations on the memory region.

16. The system of claim 15, wherein the RDMA core does not register the memory region when the RDMA hardware has permission to perform write operations on the memory region, and wherein the RDMA core registers the memory region when the RDMA hardware has permission to perform only read operations on the memory region.

17. The system of claim 12, wherein the RDMA memory region is associated with an application, and wherein the notifier identifies in the application's set of page tables a mapping from a virtual memory address to the first memory page and updates the mapping to reference the second memory page.

18. The system of claim 17, wherein the notifier sets the second memory page to a writeable mode after the mapping in the application's set of page tables is updated.

19. The system of claim 18, wherein the RDMA memory region is associated with a virtual machine.

20. A non-transitory machine-readable medium comprising a plurality of machine-readable instructions that when executed by one or more processors is adapted to cause the one or more processors to perform a method comprising:

protecting a memory region from write operations, the memory region residing on a first node and including a set of RDMA memory pages, and a list of physical memory pages specifying the set of RDMA memory pages and being associated with a memory handler, wherein the set of RDMA memory pages includes a first memory page;

allocating a second memory page, the second memory page residing on a second node;

copying data stored in the first memory page to the second memory page;

updating the list of physical memory pages by replacing the first memory page specified in the list with the second memory page; and registering memory pages specified in the updated list of physical memory pages as RDMA memory, wherein the updated list of physical memory pages is associated with the memory handler after the specified memory pages are registered.

* * * * *